Patented Nov. 14, 1939

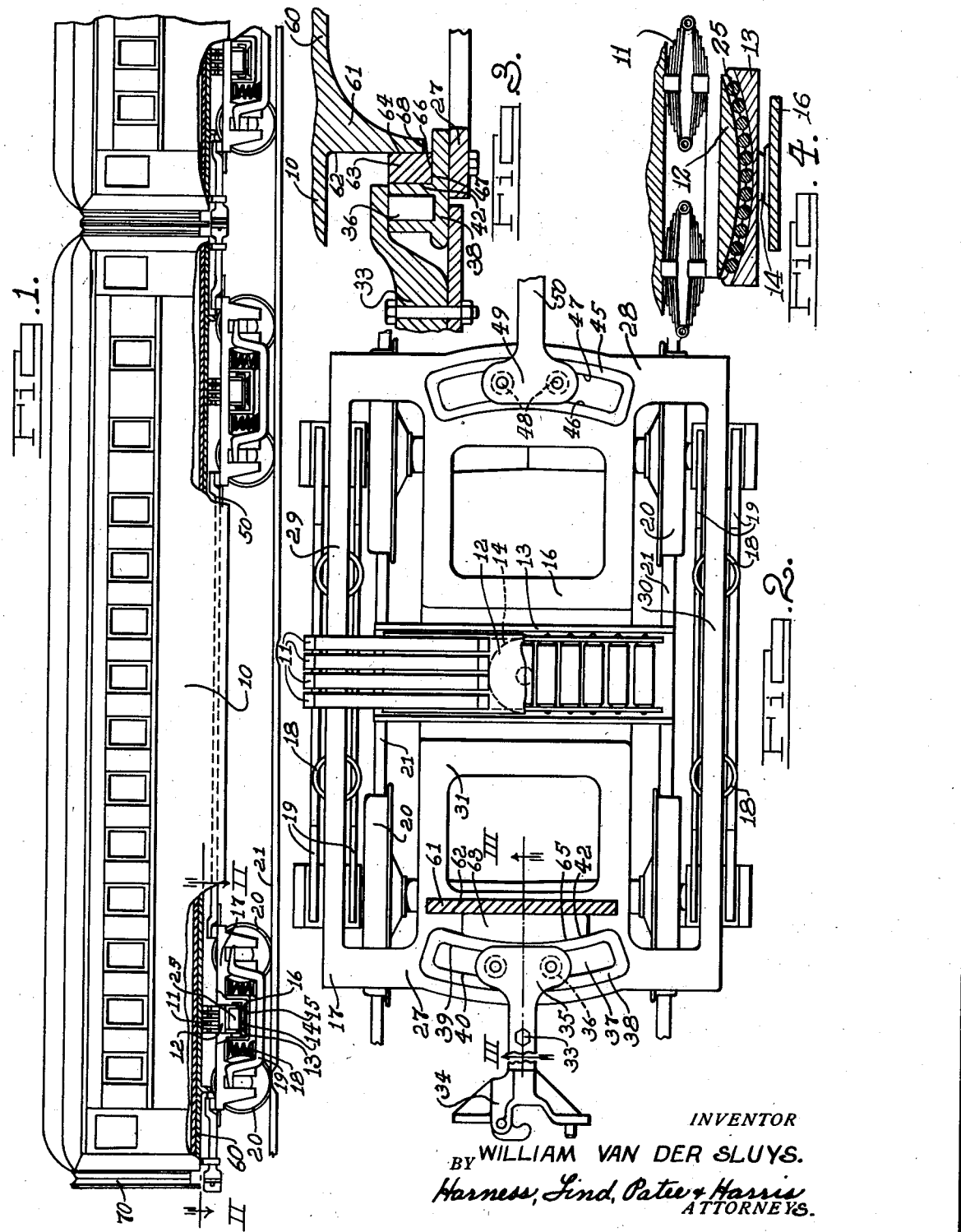

2,179,969

UNITED STATES PATENT OFFICE 2,179,969

RAILWAY VEHICLE

William Van Der Sluys, Detroit, Mich., assignor to Chrysler Corporation, Highland Park, Mich., a corporation of Delaware Application May 29, 1937, Serial No. 145,403

5 Claims. (Cl. 105—199)

My invention relates generally to vehicles and more specifically to vehicles which are adapted to be pulled or drawn over rails or tracks, such as railroad cars, and is equally applicable to cars employed in transporting either passengers or freight.

One object of my invention is to provide a novel means for transferring tensional and compressional forces between the trucks and car bodies of railroad cars.

A second object of my invention consists in providing means for transmitting forces from trucks to car bodies and vice versa and at the same time permitting complete freedom of relative movement therebetween with a minimum of frictional resistance owing to such transmission of forces.

A third object of my invention is to provide apparatus of the character indicated which is simple and inexpensive to manufacture and strong and durable in operation.

For a better understanding of my invention reference may now be had to the accompanying drawing, in which:

Fig. 1 is a side elevational view of one complete railway car and a portion of a second car constructed in accordance with my invention, being broken away for the purpose of clarity.

Fig. 2 is a plan view of one of the supporting trucks illustrated in Fig. 1, the view being taken along the line II—II thereof.

Fig. 3 is a cross-sectional detail view of a portion of the structure illustrated in Fig. 2, the section being taken along the line III—III thereof.

Fig. 4 is a fragmentary vertical cross-sectional view, on a smaller scale, of the structure illustrated in Fig. 2, the section being taken transversely of the truck through the center bearing thereof.

In the drawing I have illustrated a car body 10 mounted, by means of leaf springs 11, upon a platform 12, which, in turn, is mounted upon a second platform 13, provided with a pivotal center bearing 14. The center bearing 14 is adapted to cooperate with a second pivotal center bearing 15 mounted upon a depressed portion 16 of a truck frame 17. The weight of the truck frame 17 is carried by coil springs 18, or any other suitable type of springs, which rest on an equalizer bar 19 and thus transmit the weight of the car body 10 to wheels 20, which are adapted to roll on suitable railway tracks 21. The upper platform 12 is provided with and rests upon, rollers 25 which roll upon arcuate tracks representing the upper surface of the lower platform 13, the axis of the arc of the track being located at a point higher in the car body than is the center of gravity thereof.

As the car passes around a curve in the railroad track, the lower disposition of the center of gravity will cause the car body to tilt laterally while rolling on the track about the axis of the arc. The object of this construction is to provide a car body which will adjust itself by being tilted about an axis extending longitudinally thereof so as to maintain all of the objects therein in equilibrium when the car is subjected to centrifugal force, thus neutralizing the unbalancing effect of that force. This construction has the further advantage that if a car should be stopped on a banked track, as on a curve, it will immediately right itself to a horizontal and vertical position, thus preventing any discomfiture to the passenger riding in the car or the shifting of any merchandise carried thereby.

The truck frame 17 consists of two end portions 27 and 28 and two side portions 29 and 30, the latter of which engage the springs 18 previously described. A central portion 31 is spaced from the side portions 29 and 30 and contains the depressed portion 16 previously described.

The end portion 27 of the truck frame 17 is provided with a drawbar 33 provided at its end with a coupling member 34 of the rigid or non-bendable type, so that, when coupled to a corresponding drawbar of the adjacent car, the two drawbars constitute a unitary rigid construction. The opposite end of the drawbar 33 is provided with a supporting member 35 on which is rotatably mounted two roller members 36 which engage within an arcuate opening 37 in a guide member 38, suitably secured to the frame end 27. The opening 37 is bounded by two arcuate surfaces 39 and 40 between which the roller members 36 are disposed.

The roller members 36 are slightly smaller in diameter than the distance between the arcuate surfaces 39 and 40 so that when in engagement with either of the surfaces they may roll freely thereon without frictionally engaging the other surfaces. The surfaces 39 and 40 are cylindrical and in horizontal section represent arcs drawn about the mid-point of the center bearing 14 as an axis, which represents the center of suspension of the car body, so that any movement of the drawbar 33 about the axis of the center bearing 14, and any forces transmitted thereby, either tensional or compressional, will have an effective point of application on the truck frame at the center bearing thereof, which is the center of suspension of the car body, regardless of the angularity of the drawbar 33 with respect to the frame of the truck. The guide member 38 is likewise provided with an inner cylindrical surface 42, a horizontal cross-section of which likewise represents an arc drawn about the center of suspension of the car body as an axis.

At the opposite end 28 of the truck frame is disposed a correspondingly shaped arcuate guide member 45, provided with an inner arcuate surface 46 and an outer arcuate surface 47. The surfaces 46 and 47 are cylindrical and the horizontal cross-sections thereof represent arcs drawn about the axis of the center bearing 14. A plurality of roller members 48 are mounted upon a supported member 49 which in turn is mounted on the end of a link or internal drawbar 50, which serves to interconnect the two truck frames of any individual car. The roller members 48 are likewise of slightly smaller diameter than the distance between the arcuate surfaces 46 and 47 so that they may engage and roll freely on one of the surfaces without frictionally engaging the other arcuate surface.

From the foregoing description and illustrations it will be apparent that any tensional forces exerted on the coupling 34 and drawbar 35 will be transmitted thereby to the arcuate surface 40, to the guide member 38, and then to the frame 27 to which it is secured. In like manner, they will be transmitted from the opposite end 28 of the truck frame to the guide member 45, to the arcuate surface 47, to the rollers 48 to the connection link 50, and thus to the second truck of the car without being transmitted through the car body, which remains free to move with respect thereto on its springs without any interference from the tensional forces being transmitted through the vehicle.

Owing to the fact that compressional forces transmitted through cars are very apt to greatly exceed the tensional forces therethrough, particularly at the time of impact in switching cars, a connecting link 50 of great weight and rigidity would be necessary to transmit the compressional forces independently of the car body. As compressional forces are exerted upon a railway vehicle only a relatively small portion of its period of operation, it has been found desirable to transmit those compressional forces through the car body, thus permitting the use of a relatively light and inexpensive interconnecting link 50. It is at the same time desirable that freedom of movement of the car body with respect to the truck frame be interfered with as little as possible by the transmission of compressional force and it is primarily to this idea that my invention is directed.

As best illustrated in Figs. 2 and 3, the car body 10 is provided with a floor or base portion 60 which in turn is provided with two downwardly projecting shoulders 61, a similar construction being employed at each end of each car. The shoulder 61 is provided with a surface 62, which is vertical and extends transversely of the car body. Disposed intermediate the surface 62 and the arcuate surface 42 of the guide member 38 is a floating metallic block 63. This block is provided with a flat vertical surface 64 adapted, when in position, to closely engage the vertically extending transversely disposed surface 62 of the shoulder 61. The opposite side 65 of the block 63 is cylindrical and a horizontal cross section thereof represents an arc drawn about the axis of the center bearing 14, so that the surface 65 corresponds to and is adapted to closely engage the arcuate surface 42 of the guide member 38. The block 63 is provided with a flat bottom surface 66 with rests upon a corresponding flat supporting surface 67 on an extension of the guide member 38, the block 63 being unsecured to any of its cooperating surfaces and therefore movable with respect to each of the surfaces 42, 62 and 67. The bottom surface 68 of the shoulder 61 is arcuate and represents an arc drawn about the longitudinally extending axis of rotation of the car body. This surface does not engage any cooperating surface and is so constructed so as to readily clear the surface 67 of the guide member 38 when the car rotates about its longitudinally tilting axis.

With this construction it will be apparent that when any compressive forces are exerted on the drawbar 33 they will be transferred by the rollers 36 to the arcuate surfaces 39 of the guide member 38, thence to the arcuate surface 42 of the same guide member, to the floating block 63. As the floating block 63 closely engages the vertical surface 62 of the shoulder 61, the forces will be transferred thereby to the floor of the car body and then to the opposite end of the car where corresponding members again transfer the compression forces to a similarly arranged floating block and arcuate guide member secured to the coupling at the other end of the car.

The floating block 63 should preferably be well machined or polished, as should co-acting surfaces 42, 62 and 67 of the members 38 and 61, respectively, so that a minimum of friction will arise therebetween when relative movement occurs. The contacting surfaces of the block 63 should also be well lubricated by any suitable means, and may be provided with a suitable layer of self-lubricating material, as is now well-known in industry.

From this description it will be apparent that, even when compressional forces are being exerted through the car body, vertical movement of the car body on its springs with respect to the frame 17 is permissible, without excecessive friction, as the vertical surface 62 will slide readily on the vertical surface 64 of the floating block 63. Lateral movement of the car body with respect to the frame will likewise cause movement of the surface 62 with respect to the corresponding surface 64 of the block 63. Also, any movement about the longitudinally extending tilting axis of the car body is likewise permissible because the surface 62 will then merely slide over the block 64. On the other hand, pivotal movement of the truck frame about the axis of the center bearing 14 may readily occur because under these circumstances the contacting arcuate surface 42 slides on the arcuate surface 65, both of them representing cylindrical surfaces drawn about the axis of the center bearing 14. As a result, any movement of the car body with respect to the car frame is permitted by the floating block 63 without disengaging the various surfaces thereof and without interfering with the freedom of movement of the car body with respect to the truck frame.

As it is desirable that each car body move independently of any other car body, and that it receive forces only through its supporting trucks and drawbars, the drawbars 33 and the couplings 34 should be of such length as to prevent any contacting of the ends of adjacent cars while passing around curves in the track, or while shifting the cars in railroad yards as well as during normal operation on straight tracks. In like manner the collapsible bellows 70 disposed at the end of each passenger car for the purpose of protecting passengers walking from one car to the other should be of such construction as to prevent the transmission of any forces of any nature between the car bodies.

In the foregoing construction it will be apparent that any tensional forces exerted on the drawbar 33 are transmitted through the connecting link 50, thence to the guide member 38 at the opposite end of the opposite truck, through the floating block 63 to the projection 61 on the floor 60, and thence to the car body 10, so that the tensional forces pass through the trucks and the interconnecting link before being transmitted to the car body supported thereby.

As the interconnecting links 50 are movable on the arcs 46 and 47 it is apparent that they will center themselves and will always remain on a straight line between the center bearings of the two trucks. As a result, there is no opportunity for lost motion between the two trucks through the interconnecting link 50, despite the fact that the links 50 are connected to the end portions of the truck frames.

In this specification and the accompanying claims the term "draft forces" is used to designate those forces transmitted from one vehicle to the next adjacent vehicle through the drawbars for the purpose of propelling or decelerating the vehicle, and is used to distinguish from any other types of forces that may be imposed on the car body by the trucks by reason of irregularities in the rails, by tilting of the car body when the car passes around a curve in the tracks and the like.

Although I have illustrated but a single form of my invention and have described in detail but a single application thereof, it will be apparent to those skilled in the art that it is not so limited but that various changes and modifications may be effected therein without departing from the spirit of my invention or from the scope of the appended claims.

What I claim is:

1. In a railroad vehicle, a truck frame, a car body, means mounted on said truck frame including cooperating roller and transversely extending arcuate track members, supporting springs and a center bearing, said means being adapted to support said car body and permit it to move with respect to said truck frame by permitting it to tilt about a fixed axis extending longitudinally of the car body to neutralize the unbalancing effect of centrifugal force, in a vertical transverse plane, and about a vertical axis extending through the center bearing, and a floating block having surfaces extending parallel to the aforesaid paths of movement and adapted to maintain sliding contact with a member on said body and a second member on said truck frame at all times and adapted to transmit only draft forces therebetween.

2. In a railroad vehicle, a truck frame, a car body, means mounted on said truck frame including cooperating roller and transversely extending arcuate track members, supporting springs and a center bearing, said means being adapted to support said car body and permit it to move with respect to said truck frame by permitting it to tilt about a fixed axis extending longitudinally of the car body to neutralize the unbalancing effect of centrifugal force, in a vertical transverse plane, and about a vertical axis extending through the center bearing, and a floating block having surfaces extending parallel to the aforesaid paths of movement disposed in spaced relationship with said center bearing and adapted to maintain sliding contact with a member on said body and a member on said truck frame at all times and adapted to transmit only draft forces therebetween.

3. In a railroad vehicle, a truck frame, a car body, means mounted on said truck frame including cooperating roller and transversely extending arcuate track members, supporting springs and a center bearing, said means being adapted to support said car body and permit it to move with respect to said truck frame by permitting it to tilt about a fixed axis extending longitudinally of the car body to neutralize the unbalancing effect of centrifugal force, in a vertical transverse plane, and about a vertical axis extending through the center bearing, and a floating block disposed in spaced relationship with said center bearing and adapted to maintain contact with said body and truck frame at all times and adapted to transmit only draft forces therebetween, said floating block and the portions of the body and truck frame engaged thereby having surfaces extending parallel to the paths of movement of a portion of the body with respect to the frame throughout the said relative movements.

4. In a railroad vehicle, a truck frame, a car body, a center bearing mounted on said truck frame adapted to support said car body, means disposed intermediate said car body and said center bearing adapted to permit said car body to tilt with respect to said center bearing about an axis extending longitudinally of said car body, and means for preventing movement of said car body longitudinally of said truck frame and permitting movement of said car body with respect to said truck frame about the center bearing, in a transverse vertical plane and about said axis extending longitudinally of the car body comprising a floating block disposed in contact with a member mounted on said car body and a second member mounted on said car truck frame, said block and said members having engaging faces corresponding in contour with each of the relative paths of movement permitted thereby.

5. In a railroad vehicle, a truck frame, a car body, a center bearing mounted on said truck frame adapted to support said car body, means disposed intermediate said car body and said center bearing adapted to permit said car body to tilt with respect to said center bearing about an axis extending longitudinally of said car body, a member rigidly mounted on said truck frame adjacent one end thereof having a surface representing a cylindrical segment drawn about the axis of the center bearing, a member rigidly mounted on the car body adjacent said cylindrical segment and presenting a flat surface disposed in a vertical transverse plane, and a floating block resting on said truck frame intermediate and engaging said cylindrical segment and said member mounted on the car body, said floating block having surfaces conforming in contour with the presented surfaces of said cylindrical segment and said member mounted on the car body.

WILLIAM VAN DER SLUYS.